United States Patent
Pisklak

(10) Patent No.: US 9,279,583 B2
(45) Date of Patent: Mar. 8, 2016

(54) CATALYTIC BURNER

(75) Inventor: Thomas J. Pisklak, Coppell, TX (US)

(73) Assignee: Stonewick, Inc., Dallas, TX (US)

( * ) Notice: Subject to any disclaimer, the term of this patent is extended or adjusted under 35 U.S.C. 154(b) by 0 days.

(21) Appl. No.: 11/974,455

(22) Filed: Oct. 12, 2007

(65) Prior Publication Data

US 2008/0090188 A1 Apr. 17, 2008

Related U.S. Application Data

(60) Provisional application No. 60/851,235, filed on Oct. 12, 2006.

(51) Int. Cl.
| | |
|---|---|
| B01J 32/00 | (2006.01) |
| F23D 3/40 | (2006.01) |
| F23D 5/12 | (2006.01) |
| F23B 90/08 | (2011.01) |
| F23C 13/02 | (2006.01) |
| F23D 14/18 | (2006.01) |
| F24J 1/00 | (2006.01) |

(52) U.S. Cl.
CPC ........ F23D 3/40 (2013.01); F23D 5/126 (2013.01); F23C 13/02 (2013.01); F23D 2206/0063 (2013.01); F23D 2900/03081 (2013.01); F24J 1/00 (2013.01)

(58) Field of Classification Search
CPC .......... F23B 90/08; F23C 13/02; F23D 5/126; F23D 14/18; F23D 2206/0063; F23D 3/40; F23D 2900/03081; F24J 1/00
USPC ............... 431/7, 11, 127, 147, 203, 206, 207, 431/268, 287, 298, 310, 312, 313, 314, 431/320–326; 514/421; 422/126, 5, 125; 126/401–414
IPC ............. F23B 90/08; F23C 13/02; F23D 14/18, F23D 3/40; F24J 1/00; F23Q 11/04
See application file for complete search history.

(56) References Cited

U.S. PATENT DOCUMENTS

| 277,682 | A | * | 5/1883 | Collins | 431/147 |
| 396,041 | A | * | 1/1889 | Kidd | 431/203 |

(Continued)

FOREIGN PATENT DOCUMENTS

| EP | 277875 A1 * | 8/1988 | ............... F23D 3/08 |
| GB | 1163830 | 9/1969 | |

(Continued)

OTHER PUBLICATIONS

"11974455_20140109_EP_277875_A_I—MTrans.pdf", EPO. org, Jan. 8, 2014.*

(Continued)

Primary Examiner — Gregory Huson
Assistant Examiner — Daniel E Namay
(74) Attorney, Agent, or Firm — Winstead PC

(57) ABSTRACT

A catalytic burner is provided. The method of using the catalytic burner utilizes flameless combustion. The absence of a flame results in a more even temperature distribution throughout the length of the burner. The invention lowers the autoignition temperature by placing a catalytic surface within the burner and offers relatively even distribution of heat from the burner. Thus, the amount and location of the combustion reaction can be controlled by varying the amount and distribution of catalyst within the burner.

6 Claims, 1 Drawing Sheet

(56) References Cited

U.S. PATENT DOCUMENTS

| | | | | |
|---|---|---|---|---|
| 629,146 A * | 7/1899 | Bachner | | 431/61 |
| 651,100 A * | 6/1900 | Blakeley | | 422/126 |
| 675,524 A * | 6/1901 | Porter | | F23Q 2/30 |
| | | | | 431/268 |
| 781,490 A * | 1/1905 | Boivin | | 431/220 |
| 859,728 A * | 7/1907 | Berthold | | 431/147 |
| 865,755 A * | 9/1907 | Berthold | | 431/147 |
| 1,354,090 A * | 9/1920 | Camell et al. | | 431/268 |
| 1,362,966 A * | 12/1920 | Severance | | 431/220 |
| 1,397,077 A * | 11/1921 | Bubb | | C09C 1/52 |
| | | | | 123/1 R |
| 1,399,727 A * | 12/1921 | Zahn | | 431/268 |
| 1,819,363 A * | 8/1931 | Fernandez | | F23D 3/00 |
| | | | | 431/207 |
| 1,946,719 A * | 2/1934 | Richards | | 431/147 |
| 1,948,635 A * | 2/1934 | Sykes | | 422/119 |
| 1,964,839 A * | 7/1934 | Zahn | | 431/147 |
| 1,994,932 A * | 3/1935 | Vidal | | 422/122 |
| 2,016,901 A * | 10/1935 | Isenberg | | 431/147 |
| 2,097,973 A * | 11/1937 | Florman | | 431/147 |
| 2,110,062 A * | 3/1938 | Gibson | | F23Q 2/30 |
| | | | | 431/147 |
| 2,469,656 A * | 5/1949 | Lienert | | A61M 11/041 |
| | | | | 126/344 |
| 2,718,133 A * | 9/1955 | Oxaal et al. | | 431/147 |
| 2,818,615 A * | 1/1958 | Burness | | 422/126 |
| 2,997,869 A * | 8/1961 | Weiss | | B23K 1/00 |
| | | | | 431/147 |
| 3,240,256 A * | 3/1966 | Binkley et al. | | 431/241 |
| 3,343,586 A * | 9/1967 | Berchtold | | F23D 91/02 |
| | | | | 126/92 R |
| 3,529,911 A * | 9/1970 | Townsend | | F21L 19/00 |
| | | | | 431/107 |
| RE26,976 E * | 10/1970 | Berchtold, et al. | | F23D 91/02 |
| | | | | 360/132 |
| 3,563,457 A * | 2/1971 | Bergquist et al. | | 236/15 A |
| 3,876,365 A * | 4/1975 | Hefling et al. | | 431/329 |
| 3,995,397 A * | 12/1976 | Despard, III | | A01G 27/04 |
| | | | | 47/72 |
| 4,029,602 A * | 6/1977 | Risse | | 502/241 |
| 4,068,651 A * | 1/1978 | Rappaport | | 126/208 |
| 4,134,860 A * | 1/1979 | Hindin et al. | | 502/327 |
| 4,301,035 A * | 11/1981 | Risse | | 502/256 |
| 4,357,929 A * | 11/1982 | Johnson | | 126/96 |
| 4,663,315 A * | 5/1987 | Hasegawa et al. | | 424/76.3 |
| 4,762,275 A * | 8/1988 | Herbert et al. | | 239/6 |
| 4,849,181 A * | 7/1989 | Kelley et al. | | 422/109 |
| 4,850,858 A * | 7/1989 | Blankenship | | F23D 3/24 |
| | | | | 126/43 |
| 4,895,511 A * | 1/1990 | Schmid | | 431/126 |
| 4,964,797 A * | 10/1990 | Hilton | | F23C 13/00 |
| | | | | 122/17.1 |
| 5,094,611 A * | 3/1992 | Suppiah et al. | | 431/268 |
| 5,215,456 A * | 6/1993 | Fujiwara | | 431/7 |
| 5,234,882 A * | 8/1993 | Pfefferle | | 502/314 |
| 5,368,475 A * | 11/1994 | Suppiah et al. | | 431/268 |
| 5,394,862 A * | 3/1995 | Firatli et al. | | 126/409 |
| 5,597,771 A * | 1/1997 | Hu et al. | | 502/304 |
| 5,898,014 A * | 4/1999 | Wu et al. | | 502/302 |
| 5,948,377 A * | 9/1999 | Sung | | 423/213.5 |
| 5,981,427 A * | 11/1999 | Sung et al. | | 502/325 |
| 6,099,806 A * | 8/2000 | Cortellucci et al. | | 422/126 |
| 6,213,757 B1 * | 4/2001 | Kushch et al. | | 431/7 |
| 6,269,882 B1 * | 8/2001 | Wellington et al. | | 166/303 |
| 6,451,841 B2 * | 9/2002 | Lehoux et al. | | 514/421 |
| 6,503,459 B1 * | 1/2003 | Leonard et al. | | 422/125 |
| 6,537,061 B1 * | 3/2003 | Gomez et al. | | 431/268 |
| 6,579,090 B1 * | 6/2003 | Taubitz | | F23D 3/08 |
| | | | | 431/126 |
| 6,585,509 B2 * | 7/2003 | Young | | F23D 3/02 |
| | | | | 431/11 |
| 6,592,361 B2 * | 7/2003 | Adiga et al. | | 431/4 |
| 6,663,838 B1 * | 12/2003 | Soller et al. | | 422/125 |
| 6,746,235 B1 * | 6/2004 | Aszenbrenner | | F23D 3/02 |
| | | | | 431/125 |
| 6,814,929 B2 * | 11/2004 | Lehoux et al. | | 422/4 |
| 6,921,738 B2 * | 7/2005 | Hwang et al. | | 502/240 |
| 6,932,594 B2 * | 8/2005 | Weclas et al. | | 431/7 |
| 6,991,453 B2 * | 1/2006 | Decker et al. | | 431/320 |
| 7,137,811 B2 * | 11/2006 | Lehoux et al. | | 431/268 |
| 7,241,136 B2 * | 7/2007 | Lehoux et al. | | 431/324 |
| 7,534,029 B2 * | 5/2009 | Sorensen et al. | | 374/104 |
| 7,837,930 B2 * | 11/2010 | Grodsky | | 422/5 |
| 7,988,984 B2 * | 8/2011 | Hockaday | | 424/403 |
| 2002/0086253 A1 * | 7/2002 | Young et al. | | 431/11 |
| 2004/0151598 A1 * | 8/2004 | Young et al. | | 417/208 |
| 2004/0170936 A1 * | 9/2004 | Weclas | | F23C 99/006 |
| | | | | 431/7 |
| 2004/0265762 A1 * | 12/2004 | Lehoux et al. | | 431/268 |
| 2005/0037309 A1 * | 2/2005 | Lehoux et al. | | 431/326 |
| 2005/0066663 A1 | 3/2005 | Alvin et al. | | |
| 2005/0074370 A1 * | 4/2005 | Yuan | | 422/126 |
| 2005/0089453 A1 * | 4/2005 | Huang | | A61L 9/03 |
| | | | | 422/125 |
| 2005/0147540 A1 * | 7/2005 | Huang | | 422/125 |
| 2006/0070255 A1 * | 4/2006 | Kokuo et al. | | 34/96 |
| 2006/0134572 A1 * | 6/2006 | McMinn | | F23D 3/08 |
| | | | | 431/319 |
| 2007/0134607 A1 * | 6/2007 | Chen | | F23D 3/18 |
| | | | | 431/299 |
| 2007/0184971 A1 * | 8/2007 | Fokema et al. | | 502/177 |
| 2007/0202450 A1 * | 8/2007 | Pisklak et al. | | 431/320 |
| 2007/0292657 A1 * | 12/2007 | Sorensen et al. | | 428/116 |
| 2008/0014539 A1 * | 1/2008 | Pisklak | | C10L 1/02 |
| | | | | 431/268 |
| 2009/0126353 A1 * | 5/2009 | Han et al. | | 60/297 |

FOREIGN PATENT DOCUMENTS

| | | | | |
|---|---|---|---|---|
| JP | 56044508 A | * | 4/1981 | |
| JP | 58092711 A | * | 6/1983 | F23D 3/18 |
| JP | 62213605 A | * | 9/1987 | F23D 3/02 |
| JP | 02154906 A | * | 6/1990 | |
| JP | 04344006 A | * | 11/1992 | |

OTHER PUBLICATIONS

Copenheaver, Blaine R., "International Search Report" for PCT/US07/21856 as mailed Oct. 12, 2007, (4 pages).

\* cited by examiner

CATALYTIC BURNER

CROSS REFERENCES TO RELATED APPLICATIONS

This application claims the benefit of U.S. Provisional Application 60/851,235, filed Oct. 12, 2006.

FIELD OF THE INVENTION

The invention relates to a burner comprising a supported catalyst that provides flameless combustion of fuels.

BACKGROUND OF THE INVENTION

The invention represents an improvement over existing technology in use with burners, such as those described in U.S. Pat. No. 6,144,801, U.S. Pat. No. 6,451,841, U.S. Pat. No. 6,537,061, U.S. Pat. No. 6,814,929, U.S. 20050037309 and U.S. 20040265762. The aforementioned systems are composed of a burner, fuel, fuel reservoir, and a wick. The burners are composed of three main components: a porous ceramic body, a catalyst that is embedded in the porous ceramic body, and a wick that is inserted into the porous ceramic body.

The porous ceramic body is typically formed through the addition of a combustible material, such as carbon powder or sawdust, to a mixture of talc, clay, and binder to form a ceramic precursor. Once this mixture is extruded or molded into a desired shape the body is then calcined at >1000° C. to form the finished ceramic body. During the calcination process, the included combustible material is vaporized leaving voids, or pores in the ceramic body. Typical catalytic burners have an open porosity of 40%.

The catalyst is typically a stabilized alumina or silica microparticle supported precious metal catalyst such as those described in U.S. Pat. No. 4,029,602, U.S. Pat. No. 4,048,113, U.S. Pat. No. 4,301,035, and U.S. Pat. No. 4,368,029. The microparticle catalyst is mixed into liquid solution which is then applied to the surface of the porous ceramic body. The catalyst microparticles are smaller than the pores of the ceramic body, and are absorbed into the ceramic body and remain in place once the liquid is removed, in this manner the catalyst is embedded into the porous ceramic body.

The wick is typically composed of cotton or cellulose fiber, and is long enough so that it extends from the interior of the ceramic body to the bottom of the fuel reservoir. The fuel is typically composed of 90 wt % 2-propanol, 8 wt % $H_2O$, and 2 wt % fragrance.

To operate the catalytic burners, the burner assembly is first placed on top of a fuel reservoir with the wick extending into the fuel/fragrance mixture. The fuel/fragrance mixture travels up the wick and into the pores of the porous ceramic body. Once the porous ceramic body is completely saturated, an open flame is applied to the surface of the ceramic body to ignite the absorbed fuel/fragrance mixture. The open flame is removed and the ignited fuel/fragrance mixture is allowed to burn. The burning fuel/fragrance mixture, which produces a ~6 inch flame, is extinguished after ~3 minutes. The igniting process serves two functions; first the flame consumes and/or desorbs the excess fuel from the porous ceramic body and second, once the excess fuel is desorbed, the flame heats the embedded catalyst particles to the appropriate temperature (~150° C.) for continued operation. This starts a cyclical process in which the ceramic absorbs heat from the catalyst, the heated ceramic body vaporizes the fuel in the wick, the vaporized fuel passes over the catalyst and is combusted, and the catalytic combustion process provides heat back to the ceramic body. During this process the majority of the fuel/fragrance mixture is not consumed by the catalyst but is emitted into the surrounding atmosphere at a high rate, typically ~12.0 grams/hour.

There are several problems, or drawbacks, associated with this system, such as: degradation of the cellulose wick, clogging of the pores in the ceramic body, large open flame (>6 inches) during start up, and long initial set-up (>15 minutes). Wick degradation occurs because, to achieve the necessary communication of the fuel with the catalytic burner, the wick must be in intimate contact with the catalytic burner, which can exceed temperatures of 250° C. during operation. The elevated temperature causes the cellulose wick to degrade and carbonize. Degradation of the wick causes the loss of fuel flow to the catalytic burner due to accumulation of the carbonized wick material in the pores of the ceramic burner and loss of intimate contact between the ceramic body and wick. The loss of fuel flow eventually causes irreversible failure of the catalytic burner. Clogging of the pores can also occur from accumulation of partially decomposed fragrance. During normal operation, a portion of the fragrance is not evaporated, but instead is decomposed inside the pores of the ceramic body. Over time, build up of this decomposed material occludes the pores of the ceramic and prevents the fuel vapor from reaching the catalyst.

The large flame that is necessary for start-up is a drawback of the system due to safety concerns. The large flame could easily ignite nearby drapes, paper, or other items, thereby causing uncontrolled fires. The currently available systems also require a long initial set-up (>15 min.) which is not consumer friendly. The catalytic burner assembly is placed in the pre-filled fuel reservoir and can not be operated until the fuel flows up the wick and completely saturates the catalytic burner, which can take longer than 15 minutes.

To overcome the above problems, a system has been developed in which the use of ceramic or other porous materials in the construction of burners is eliminated.

SUMMARY OF THE INVENTION

An aspect of the claimed invention is directed to a catalytic burner, the burner comprising a non-porous structure having at least two ends, wherein the structure houses a wick at a first end and is in communication with a non-porous substrate at a second end, a fuel reservoir that is in communication with the wick; and a catalyst that is deposited on the non-porous substrate in an amount that is effective to cause combustion of an amount of fuel.

A second aspect of the invention is directed to a method of using a catalytic burner comprising the steps of providing a catalytic burner comprising a housing, providing a wick that contacts a fuel reservoir, wherein the wick is located at a first end of the housing, providing a catalyst substrate, wherein the substrate contacts a second end of the housing, providing a flow of fuel along the wick, heating the housing by placing an ignition source in close proximity to the housing, and combusting the fuel flowing through the wick.

DETAILED DESCRIPTION OF EXEMPLARY EMBODIMENTS

Figure 1A:
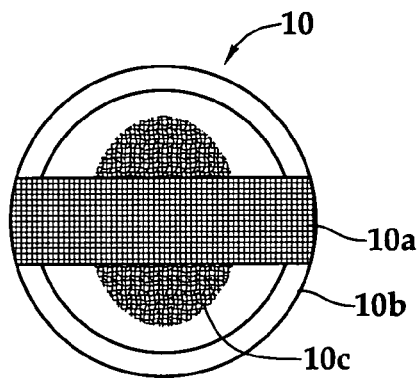
FIG. 1A shows a top view of a collar style catalytic burner according to the present invention.

Embodiments of the inventions remedy the aforementioned deficiencies found in the current prior art systems. Embodiments of the invention relate to the objective of providing a burner comprising a catalyst that provides improved combustion through efficient use of use.

Generally, flameless combustion is accomplished by preheating combustion air and fuel gas sufficiently that when the two streams are combined the temperature of the mixture exceeds the auto-ignition temperature of the mixture, but to a temperature less than that which would result in the oxidation upon mixing being limited by the rate of mixing. Without a catalyst surface present, preheating of the streams to a temperature between about 1500° F. and about 2300° F. and then mixing the fuel gas into the combustion air in relatively small increments is required in order for flameless combustion to occur.

According to an embodiment of the invention, a catalyst is deposited on a non-porous substrate in a manner such that the catalyst is strongly adhered to the substrate. In certain embodiments of the invention, the catalyst is deposited on a metal substrate. In other embodiments of the invention, the catalyst is deposited on a dense, non-porous substrate. Examples of dense non-porous substrates include, without limitation, glass and non-porous ceramic materials. Indeed, any suitable non-porous materials may be used to construct the substrate upon which the catalyst is deposited.

In an embodiment of the invention, a supported catalyst is provided. In this embodiment, a catalyst is first deposited on a support. Following this step, the supported catalyst is deposited on a non-porous substrate. In this embodiment, the support upon which the catalyst is deposited can be any material that exhibits a high cell density, a thin wall thickness and sufficient strength for catalytic applications, while exhibiting a sufficiently high geometric surface area for metal catalyst impregnation. Examples of support materials that meet these requirements include, without limitation, zeolite and alumina.

In an embodiment of the invention, the substrate containing the catalyst is contacted with a housing that contains a wick saturated with an appropriate fuel. In some embodiments, the substrate is contacted with the wick-containing housing by wrapping the catalyst-containing substrate around the housing. In this embodiment, a substantial portion of the substrate contacts the housing at one or more locations around its circumference.

In another embodiment of the invention, the catalyst-containing substrate is suspended over a housing containing the wick. In this embodiment, the substrate may contact the housing at one or more points on the sides of the housing, while a substantial portion of the substrate does not contact the housing.

According to certain embodiments of the invention, the housing that contains the wick is made of a substance that is an effective conductor of heat. In certain embodiments of the invention, the housing is made of one or more metals or a metal alloy.

According to an embodiment of the invention, the housing is heated with a heating source, which in turn heats the catalyst-containing substrate. In certain embodiments of the invention, the heating source may be a lighter, match or resistive heater.

According to an embodiment of the invention, the catalyst is ignited by an ignition source having a flame. In certain embodiments of the invention, the catalyst is ignited by a flameless ignition source.

According to an embodiment of the invention, the catalyst and housing are heated and the temperature is raised to a suitable working temperature. Once the appropriate working temperature is reached the catalyst begins to combust the fuel.

In an embodiment of the invention, the combustion of the fuel occurs in a cyclical manner. The catalyst and housing are heated and the temperature is raised to a suitable working temperature. When the appropriate working temperature is reached, the catalyst begins to combust the fuel, thus heating the substrate upon which the catalyst is deposited. The catalyzed substrate in turn heats the housing containing the wick. The heated housing heats the fuel saturated wick contained within the housing. The heating of the wick vaporizes the fuel. The fuel vapors flow over the catalyst and are combusted by the catalyst. The excess heat generated by the combustion of the fuel heats the housing. The heated housing in turn heats the wick, thereby repeating the fuel combustion cycle.

According to an embodiment of the invention, the bulk of the fuel is not consumed by the catalyst during this process, but is emitted into the surrounding atmosphere at a high rate. In certain embodiments of the invention, the fuel is emitted into the atmosphere at ~9.0 to 12.0 grams/hour. The emission of the fuel into the atmosphere by an embodiment of the invention provides a suitable vehicle by which volatile substances such as fragrances, perfumes and other products that are soluble in the fuel may be emitted into the atmosphere.

In an embodiment of the invention, the fuel may contain one or more chemical compounds. In such an embodiment, the fuel/chemical compound mixture comes into intimate contact with the catalyst to transform the chemical compound(s) in some fashion. In certain embodiments, the transformation of the chemical compound(s) enhances the combustion of the fuel.

A catalytic burner as embodied herein is not subject to the problems and drawbacks associated with the porous ceramic catalytic burner systems. By carefully selecting the material from which the housing of the catalytic burner is constructed, the wick can be situated so that it is not in direct contact with the housing. This lack of contact between the wick and the housing greatly reduces the rate at which the wick is degraded and increases the lifetime of the burner. Additionally, degradation of the wick, even if it were to occur, does not affect the overall performance to as high a degree in the claimed invention, as it does in the porous ceramic system.

When loss of fuel flow occurs due to wick degradation, the degraded wick can easily be replaced with a new wick without loss of function. Although the fragrance may still be partially degraded and remain on the wick, the wick continues to function. However, the claimed invention does not have pores that can become clogged, as happens with porous ceramic burners.

In certain embodiments of the invention, ignition of the catalyst is achieved without a flame. Since the catalyst is situated over or around the housing containing the saturated wick, and does not contact the wick there is no need to desorb the fuel from the catalyst to achieve ignition. Rather, the only requirement is that the system receives enough heat to reach the working temperature of the catalyst. In certain embodiments of the invention, the catalyst and housing are heated and the temperature is raised to a suitable working temperature of around 250° C. Additionally, unlike other systems where the catalyst is required to absorb fuel before it can be combusted, only the wick needs to absorb fuel before operation of the burner in the claimed invention. In certain embodiments of the invention, the amount of fuel that is required to sustain combustion of the catalyst is absorbed in a very short time after the wick comes into contact with the fuel. In an embodiment of the invention, the amount of time for the wick to absorb an effective amount of fuel to sustain combustion of the catalyst is less than 5 minutes.

In general, the invention relates to a catalytic burner that is capable of self-sustained operation after initial start up. According to an embodiment of the invention, the catalytic burner operates on a fuel mixture that is contained in a reservoir and delivered to the burner via an absorbent wick.

According to an embodiment of the invention, the catalytic burner is composed of three main parts: an absorbent wick, a housing and a catalyst that has been deposited on a suitable substrate (FIGS. 1 and 2). The construction of the burner and the geometry of the supported catalyst, allow the catalytic burner to operate continuously for extended periods of time. In certain embodiments of the invention, a catalytic burner that is constructed and operated as set forth herein can operate continuously for around 184 hours.

According to an embodiment of the invention, the housing can be composed of any metal or metal alloy such as (but not limited to): brass, brass alloy, medium leaded brass, high leaded brass, extra high leaded brass, free cutting brass, phosphor bronze, free cutting phosphor bronze, aluminum bronze, brass, bronze, brass or bronze alloy, aluminum, aluminum alloys, or stainless steels.

In certain embodiments, the housing can be composed other non-porous materials such as glass and high density ceramic.

The housing can be formed in any shape that is suitable for holding a wick. Examples of suitable shapes for the housing include a collar-style housing (FIGS. 1A and 1B) or tube-style housing (FIGS. 2A and 2B).

Figure 2A:
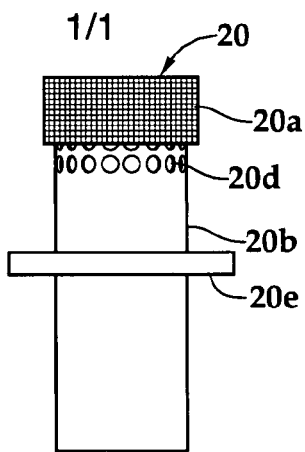
FIG. 2A shows a side view of a tube style catalytic burner according to the present invention.
Figure 2B:
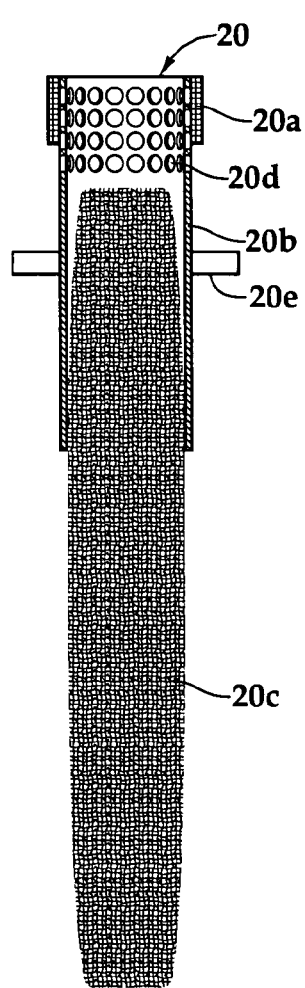
FIG. 2B shows a cross-sectional view of a tube style catalytic burner according to the present invention.
Figure 1B:
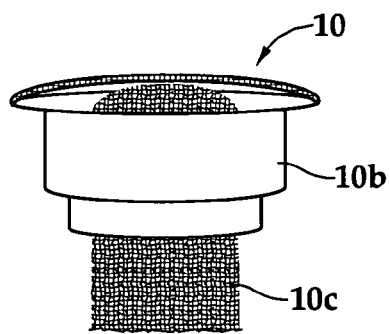
FIG. 1B shows a side view of a collar style catalytic burner according to the present invention.
Figure 3A:
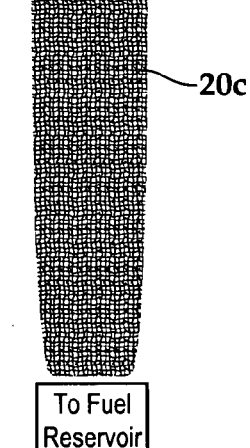
FIGS. 3A-3G show the geometries of catalyzed substrates that can be used in catalytic burners according to the present invention. The top half of each figure represents the top view of a catalyzed substrate in a particular geometry, and the bottom half represents the side view of the catalyzed substrate in the same geometry.
Figure 3A:
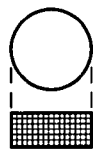
Figure 3C:
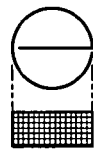
Figure 3E:
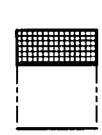
Figure 3G:
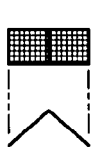
Figure 3B:
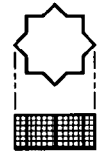
Figure 3D:
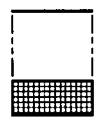
Figure 3F:

Referring now to FIGS. 1A and 1B, the drawings represent a collar-style catalytic burner (10) according to the present invention. The collar (10b) serves as the housing which holds the wicking material tightly in place. The substrate containing the supported catalyst (10a) is held in place over the wicking material. The substrate is held in place by making contact with the sides of the collar or housing (10b). In this embodiment, the catalyst (10a) is not in direct contact with the wicking material. However, the heat that is radiated from the catalyst during operation is directed towards the fuel-filled wicking material. The catalyzed substrate (10a) is held by the collar at a suitable distance from the fuel filled wick so as to maximize evaporation of the fuel and minimize degradation of the wick. The distance between the surface of the catalyst and the surface of the wick can range from 0.01 to 0.50 inches, but is preferably 0.20 inches.

To further minimize degradation of the wick, the collar (10b) can be designed in a manner so as to control the amount of heat that reaches the wicking material. This may be accomplished by separating the wick from the catalyzed substrate with a perforated material that acts as a heat shield, but allows the passage of vapors. The configuration of the catalytic burner allows for continuous cyclical operation, wherein the fuel (absorbed by the wick) is vaporized by the supported catalyst. The vaporized fuel flows over the catalyst and is catalytically combusted. The catalytic combustion produces heat at a temperature of around 250° C. The heat produced by the catalyst radiates to the wick (10c), which causes vaporization of fuel, and the process is repeated. During this process the majority of the fuel is not consumed by the catalyst but is emitted into the surrounding atmosphere at a high rate, typically ~9.0 to 12.0 grams/hour.

According to an alternate embodiment of the invention, the housing can also be formed into a tubular shape. FIGS. 2A and 2B depict a tube-style catalytic burner (20) according to the present invention. The tube shaped body (20b) can be composed of any metal or metal alloy such as (but not limited to): brass, brass alloy, medium leaded brass, high leaded brass, extra high leaded brass, free cutting brass, phosphor bronze, free cutting phosphor bronze, aluminum bronze, brass, bronze, brass or bronze alloy, aluminum, aluminum alloys, or stainless steels, or made from glass or a non-porous ceramic. In an embodiment of the invention, the metal used to construct the tube-style metal housing is stainless steel.

In certain embodiments of the invention where a tube-style housing is employed, the housing has a wall thickness ranging from 0.005 to 0.04 inches. A preferred wall thickness for a tubular housing is 0.01 inches. In an embodiment of the invention, the catalyzed substrate (20a) is wrapped around and/or over the tubular housing and held in place by connectors at a distance of 0.01 inches to 0.10 inches, and more preferably 0.05 inches from the outer surface of the tube. The tubular housing (20b) also serves to hold the wick (20c) at the proper location to efficiently deliver fuel and/or fuel vapors to the catalyst. A support ring (20e) serves to position the catalytic burner when the burner is placed on top of a fuel reservoir.

In certain embodiments of the invention, the tubular body contains perforations (20d) around the circumferential portion of the tubular housing. The perforations permit a larger volume of vaporized fuel to reach the catalyst, in embodiments where the substrate containing the catalyst surrounds the tubular housing. The perforations may cover up to 90% of the surface of the tubular housing. In an embodiment of the invention, the perforations comprise 2% of the surface and are located along an upper circumferential portion of the tubular housing.

According to embodiments of the invention, the substrates comprising the supported catalyst (10a or 20a) are situated at a suitable distance from the wick (10c or 20c) to provide a limited region wherein the oxidation reaction temperature is lowered. Distribution of these catalytic surfaces provide for distribution of heat release within the burner. The catalytic substrates are sized to accomplish a nearly even temperature distribution along the burner. A nearly even temperature profile within the burner results in more uniform heat distribution. A more even temperature profile will also result in the lower maximum temperatures for the same heat release. Because the materials of construction of the burner dictate the maximum temperatures, even temperature profiles will increase the heat release possible for the same materials of construction.

Preheating of the fuel gases to obtain flameless combustion without a catalyst would result in significant generation of carbon unless a carbon formation suppressant is included in the fuel gas stream. The need to provide such a carbon formation suppressant is therefore avoided by operating the burner in the presence of a catalyst.

In embodiments of the invention, initial ignition is accomplished by using a source that generates a flame or spark. According to embodiments of the invention, ignition is accomplished by injecting pyrophoric material, an electrical igniter, a spark igniter, temporally lowering an igniter into the space between the wick and the catalyst substrate, or an electrical resistance heater. The substrate is preferably rapidly brought to a temperature at which a flameless combustion is sustained to minimize the time period at which a flame exists within the burner. The rate of heating the substrate will typically be limited by the thermal gradients the burner can tolerate.

In an embodiment of the invention, the catalytic burner assembly is ignited by bringing an open flame close to the burner for a short period time. The time required to ignite a burner assembly of the invention using an open flame is 20 seconds or less.

The ignition of the catalytic burner according to embodiments of the invention, can be enhanced by provision of supplemental oxidants during the start-up phase, or by use of a fuel that has a lower catalyzed autoignition temperature such as hydrogen. Preferred supplemental oxidants include supplemental oxygen and nitrous oxide. Hydrogen can be provided along with a natural gas stream, and could be provided as shift gas, with carbon monoxide present and carbon dioxide present.

The use of start-up oxidants and/or fuels is preferred only until the catalyst has been heated to a temperature sufficient to enable operation with a fuel of choice and air as the oxidant. According to embodiments of the invention, methanol, ethanol, propanol, butanol, dimethyl ketone, ethyl acetate, methane, ethane, propane, butane, propylene glycol, dimethyl formamide or any other suitable fuel known in the prior art can be used as the working fuel in embodiments of the invention.

Noble metals such as palladium or platinum, or semi-precious or precious metals, base metal or transition metals and their oxides can be used as catalyst in embodiments of the invention. The metals or their oxides can be deposited or coated, preferably by electroplating (or pulsed laser deposition (PLD), chemical vapor deposition (CVD), electrophoretic deposition (EPD), washcoating, hydrothermal treatment, or microwave assisted hydrothermal treatment) onto a surface of the catalyst support to enhance oxidation of the fuel at lower temperatures. The metal could then be oxidized as necessary to provide a catalytically effective surface. Such a catalytic surface has been found to be extremely effective in promoting oxidation of fuels in air at temperatures as low as 500° F. This reaction rapidly occurs on the catalytic surface and in the adjacent boundary layer. An advantage of having a significant catalytic surface as part of the catalytic burner assembly of the invention, is that the temperature range within which the flameless combustor operates can be significantly increased.

According to embodiments of the invention, the supported catalyst is deposited on the non-porous substrate by methods such as coating, electroplating, vapor deposition or electrohoretic deposition.

According to embodiments of the invention, semi-precious metals, and transition metal oxides, for e.g., gold, silver, chromium oxide and cobalt oxide may be used as catalysts in embodiments of the invention. Indeed, metal catalysts such as palladium and platinum can be doped with other metal or metal oxide catalysts to promote chemical transformations in conjunction with the burner.

In an embodiment of the invention, the catalyst is deposited on a support such as an alumina or silica microparticle or nanoparticle. The catalyzed particle can then be deposited on any suitable substrate to form the catalyzed substrate.

According to an embodiment of the invention, the substrate on which the catalyst is deposited is any material to which the catalyst can be adhered and which can withstand temperatures greater than 500° C. In certain embodiments of the invention, the substrate is composed of a material such as (but not limited to), alumina, alumina fiber, fiberglass, Nextel® ceramic fiber or any other ceramic fiber, any refractory ceramic fiber, any synthetic vitreous fiber, silicon carbide fibers, silicon nitride fibers, zirconia fibers, or Fiberfrax® ceramic fibers, cordierite, mullite, porcelain, alumina, silicon nitride, zirconia, steatite, wollastonite or any non-porous ceramic.

In other embodiments of the invention, the substrate is composed of a metal such as (but not limited to), stainless steel, stainless steel alloys, inconel, zinc alloys, titanium, or any metal or alloy. A metal substrate can be expanded, perforated, or in the form of sheets, wires, mesh, or gauze.

According to embodiments of the invention, the catalyzed substrate can be formed into various geometries to improve burner functionality and external appearance. The geometry of the catalyzed substrate can be varied to optimize the performance of the catalytic burner for various types of fuel (FIGS. 3A to 3G). Examples of the various geometries of catalyzed substrate include, but are not limited to, circular (FIG. 3A), crimped (FIG. 3B), theta ($\theta$) shape (FIG. 3C), vertical (FIG. 3D), horizontal (FIG. 3E), tent shaped (FIG. 3F), roof shaped (FIG. 3G), or any other shape that provides optimal fuel vapor flow over the catalyst.

According to an embodiment of the invention, the function of the wick ($10c$ and $20c$) is to transport fuel or permit fuel to flow from the fuel reservoir to the upper region of the catalytic burner. The wick may be any device or material which provides adequate fuel flow to support continuous operation of the catalytic burner and combustion of the catalyst.

In certain embodiments of the invention, the wick is composed of a porous material. Suitable examples include any wicking material such as (but not limited to): cotton cloth, alumina, alumina fiber, fiberglass, Nomex®, TeijinConex®, TeijinConex® HT, or any meta-aramid fiber, Kevlar®, Technocrat®, Tarpon®, or any para-aramid fiber, Teflon®, Tooling®, or any fluorocarbon fiber, Raton®, Procom®, Toray PPS®, or any polyphenylene sulfide fiber, Basofil® or any melamine fiber, Zylon®, or any poly (phenylene benzobisoxazole) fiber, polybenzimidazole fibers, P-84®, or any polyimide fibers, Lastan®, polyacrylonitrile, or any carbon fibers, glass fibers, or any formulation of glass fibers, Spectra®, Dyneema®, or any high density polyethylene fibers, Nextel® ceramic fiber, or any ceramic fiber, any refractory ceramic fiber, any synthetic vitreous fiber, silicon carbide fibers, silicon nitride fibers, zirconia fibers, or Fiberfrax® ceramic fibers.

In certain embodiments of the invention, the wick may be composed of porous materials, fritted metal, or any material that is capable of transporting of fuel from the reservoir to a region near the catalyst.

In other embodiments of the invention, the wick may also be any device which provides fuel transport from the fuel reservoir to the catalytic burner, such as (but not limited to): capillary pumps, fluid pumps, microfluidic systems, or any device or system capable of fluid transfer.

WORKING EXAMPLES

Example 1

Precious Metal Catalyst on Metal Substrate
Suspended Over Metal Collar Configuration A catalyzed Inconel substrate was prepared by coating with a precious metal catalyst supported on alumina nanoparticles. The Inconel substrate was an expanded sheet 0.25" high by 2.0" long by 0.012" wide. The catalyzed substrate was connected to a brass (Brass Alloy 260) collar which contained a fiberglass wick. The catalytic burner assembly was placed on a filled fuel reservoir. The wick was allowed to absorb fuel for ten minutes. An open flame was then held to the catalytic burner assembly for 20 seconds. After removing the open flame, the catalytic burner was allowed to continuously operate for 5 hours with an average emission rate of 9.0 g/hr.

Example 2

Precious Metal Catalyst on Ceramic Support Suspended Over Metal Collar Configuration A non-porous ceramic catalyst support was prepared by mixing 35.0 grams kaolin, 25.0 grams talc, and 3.4 grams CMC gum in a ball mill for 3 hours. 30.0 grams DI water was then added and the mixture was kneaded into a dough consistency. The dough was extruded as ¼" by ¾" flat pieces. The pieces were dried at room temperature for 24 hours and then heated to 1200° C. for 4 hours and allowed to cool naturally. One side of the dense ceramic pieces was coated with precious metal catalyst supported on alumina nanoparticles. The catalyzed ceramic was suspended over a fiberglass wick, with the catalyzed side facing the wick, using a brass (Brass Alloy 260) collar to hold it in place. The catalytic burner assembly was then placed in a fuel reservoir, and then, once fuel had been absorbed, ignited for 20 seconds, and blown out. The catalytic burner was allowed to operate continuously for 5 hours with an average emission rate of 7.0 g/hr.

Example 3

Precious Metal Catalyst on a Metal Substrate Around Metal Tube Configuration

A catalyzed Inconel substrate was prepared by coating with a precious metal catalyst supported on alumina nanoparticles. The Inconel substrate was an expanded sheet 0.25" high by 2.0" long by 0.012" wide. The catalyzed substrate was suspended around a brass (Brass Alloy 260) tube at a distance of 0.05" from the outside of the tube. The metal tube was 0.50" in diameter and 1.4" in length and perforated with 48 holes 0.0625" in diameter. The holes were equally spaced in four lines around the top 0.50" of the metal tube. A cotton wick was placed inside the tube to complete the catalytic burner assembly. The catalytic burner assembly was placed on a filled fuel reservoir. The wick was allowed to absorb fuel for ten minutes. An open flame was then held to the catalytic burner assembly for 20 seconds. After removing the open flame the catalytic burner was allowed to continuously operate for 5 hours with an average emission rate of 12.0 g/hr.

Example 4

Precious Metal Catalyst on Ceramic Substrate Around Metal Tube Configuration

A non-porous ceramic catalyst support was prepared by mixing 35.0 grams kaolin, 25.0 grams talc, and 3.4 grams CMC gum in a ball mill for 3 hours. 30.0 grams DI water was then added and the mixture was kneaded into a dough consistency. The dough was extruded as a hollow cylinder 0.25" tall with an outside diameter of 0.575" and an inside diameter of 0.50". The hollow cylinder was dried at room temperature for 24 hours and then heated to 1200° C. for 4 hours and allowed to cool naturally. The outside of the dense ceramic hollow cylinder was coated with precious metal catalyst supported on alumina nanoparticles. The catalyzed ceramic substrate was fit around a brass (Brass Alloy 260) tube. The metal tube was 0.50" in diameter and 1.4" in length and perforated with 48 holes 0.0625" in diameter. The holes were equally spaced in four lines around the top 0.50" of the metal tube. A cotton wick was placed inside the tube to complete the catalytic burner assembly. The catalytic burner assembly was placed on a filled fuel reservoir. The wick was allowed to absorb fuel for ten minutes. An open flame was then held to the catalytic burner assembly for 20 seconds. After removing the open flame the catalytic burner was allowed to continuously operate for 5 hours with an average emission rate of 9.0 to 12.0 g/hr.

What is claimed is:

1. A self-sustained catalytic burner assembly, wherein the burner assembly comprises:
    a single tubular, hollow metal housing, wherein the housing comprises perforations along the upper circumferential end of the housing that occupy from 2% to 90% of the surface of the housing;
    a wick, wherein a top portion of the wick is inserted into a bottom end of the housing and does not contact the housing, and a bottom portion of the wick is contacted with fuel;
    a catalyst that is supported on a metal substrate, wherein the supported catalyst is wrapped around the upper circumferential end of the housing; and
    a fuel reservoir that is in communication with the bottom portion of the wick.

2. The burner assembly according to claim 1, wherein the catalyst contains palladium.

3. The burner assembly according to claim 1, wherein the catalyst contains platinum.

4. The burner assembly according to claim 1, wherein the wick is made of a porous material.

5. The burner assembly according to claim 4, wherein the porous material is selected from the group consisting of cloth, alumina fiber, carbon fiber, glass fiber or ceramic fiber.

6. The burner assembly according to claim 1, wherein the metal substrate is a mesh.

\* \* \* \* \*